(12) United States Patent
Johnson et al.

(10) Patent No.: US 10,928,340 B2
(45) Date of Patent: Feb. 23, 2021

(54) METHOD AND APPARATUS FOR CONTROLLING CONTACT OF COMPOSITE TOWS

(71) Applicant: The Boeing Company, Chicago, IL (US)

(72) Inventors: Brice A. Johnson, Federal Way, WA (US); Sayata Ghose, Sammamish, WA (US); Tyler M. Holmes, Seattle, WA (US); Hong Hue Tat, Redmond, WA (US); Gary Ernest Georgeson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 158 days.

(21) Appl. No.: 16/009,149

(22) Filed: Jun. 14, 2018

(65) Prior Publication Data

US 2019/0383759 A1    Dec. 19, 2019

(51) Int. Cl.
| | | |
|---|---|---|
| *G01N 25/72* | (2006.01) | |
| *B29C 70/38* | (2006.01) | |
| *G01N 11/14* | (2006.01) | |
| *B32B 41/00* | (2006.01) | |
| *G01N 21/84* | (2006.01) | |

(52) U.S. Cl.
CPC ............. *G01N 25/72* (2013.01); *B29C 70/38* (2013.01); *G01N 11/14* (2013.01); *B32B 2041/04* (2013.01); *G01N 2021/8472* (2013.01)

(58) Field of Classification Search
CPC ..... B32B 41/00; B32B 2041/04; B29C 70/38; B29C 70/382; B29C 70/384; B29C 70/386; B29C 70/388; G01N 11/14; G01N 25/72; G01N 2021/8472
See application file for complete search history.

(56) References Cited

U.S. PATENT DOCUMENTS

| | | | |
|---|---|---|---|
| 5,447,586 A * | 9/1995 | Tam | .................... B29C 53/8041 156/64 |
| 2003/0102070 A1* | 6/2003 | Black | .................. B29C 35/0288 156/64 |
| 2006/0191622 A1 | 8/2006 | Ritter et al. | |
| 2014/0124120 A1 | 5/2014 | Pham et al. | |

OTHER PUBLICATIONS

Johnson et al., "Heater System for Fiber Placement Machine," U.S. Appl. No. 15/689,703, filed Aug. 29, 2017, 55 pages.
Extended European Search Report, dated Oct. 4, 2019, regarding Application No. 19165359.1, 8 pages.

* cited by examiner

*Primary Examiner* — George R Koch
(74) *Attorney, Agent, or Firm* — Yee & Associates, P.C.

(57) ABSTRACT

An infrared camera is directed aft of a compaction roller of a composite laying head. Heat is applied to a substrate by a heater mounted forward of the compaction roller. Infrared images are captured of composite tows laid down on a substrate by the compaction roller. Whether the composite tows have sufficient contact is determined using the infrared images.

20 Claims, 9 Drawing Sheets

METHOD AND APPARATUS FOR CONTROLLING CONTACT OF COMPOSITE TOWS

BACKGROUND INFORMATION

1. Field

The present disclosure relates generally to composite manufacturing and, more specifically, to improving manufacturing quality of composite structures. Yet more specifically, the present disclosure relates to using infrared images of composite tows to control contact of the composite tows.

2. Background

Platforms, such as aircraft and automobiles, are being designed and manufactured with greater and greater percentages of composite materials. Composite materials are used in aircraft to decrease the weight of the aircraft. This decreased weight improves performance features such as payload capacities and fuel efficiencies. Further, composite materials provide longer service life for various components in an aircraft.

However, monitoring and process control of composite material quality during the manufacturing process is a challenge. Composite materials are laid up in layers. Bonds between layers of uncured composite material affect characteristics, such as strength, of a resulting, cured composite structure. These bonds between the uncured composite layers are affected by the "intimate contact" between the layers. The strength of the bonds between the uncured composite layers may also be referred to as "tack" of the layers. Decreasing the "intimate contact" between uncured composite layers may decrease the tack between the layers.

Conventional inspection for bonds between uncured composite layers include visual inspection by operators. A visual inspection by an operator is a qualitative rather than quantitative measure. A visual inspection by an operator is not desirably sensitive.

Therefore, it would be desirable to have a method and apparatus that takes into account at least some of the issues discussed above, as well as other possible issues. For example, it would be desirable to have at east one of a method or an apparatus to quantitatively evaluate at least one of contact or strength of the bonds between uncured layers of composite material. As another example, it would be desirable to have at least one of a method or an apparatus to provide more sensitive inspection of at least one of contact or the strength of the bonds between uncured layers of composite material.

SUMMARY

An illustrative example of the present disclosure provides a method. An infrared camera is directed aft of a compaction roller of a composite laying head. Heat is applied to a substrate by a heater mounted forward of the compaction roller. Infrared images are captured of composite tows laid down on the substrate by the compaction roller. Whether the composite tows have sufficient contact is determined using the infrared images.

Another illustrative example of the present disclosure provides a method. Composite tows are laid down using a composite laying head with a compaction roller and a heater mounted forward of the compaction roller. Infrared images are captured of composite tows, after laying down the composite tows, using an infrared camera mounted aft of the compaction roller. A level of tack is determined using the infrared images.

Yet another illustrative example of the present disclosure provides a system. The system comprises a composite laying head with a compaction roller, a heater mounted forward of the compaction roller, an infrared camera mounted aft of the compaction roller, and a composite analyzer. The infrared camera is configured to capture infrared images of composite tows laid down on a substrate by the compaction roller. The composite analyzer is configured to determine whether the composite tows have sufficient contact using the infrared images.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that Automated Fiber Placement (AFP) is a composite fabrication process. The illustrative embodiments recognize and take into account that Automated Fiber Placement (AFP) is a highly sensitive process. The illustrative embodiments recognize and take into account that out-of-tolerance fabrication can add undesirable costs and flow time to the manufacturing process. The illustrative embodiments recognize and take into account that a means for monitoring, controlling, and improving the Automated Fiber Placement (AFP) process is desirable.

The illustrative embodiments recognize and take into account that intimate contact between uncured composite layers affects the strength of a bond between the uncured composite layers, also be referred to as "tack." The illustrative embodiments recognize and take into account that conventional visual inspection is a qualitative measure of tack rather than quantitative measure of tack. The illustrative embodiments recognize and take into account that uncured composite tows may have different levels of tack, described as tacked, lightly tacked, or untacked. The illustrative embodiments recognize and take into account that a quantitative measure of tack is desirable.

Figure 1:
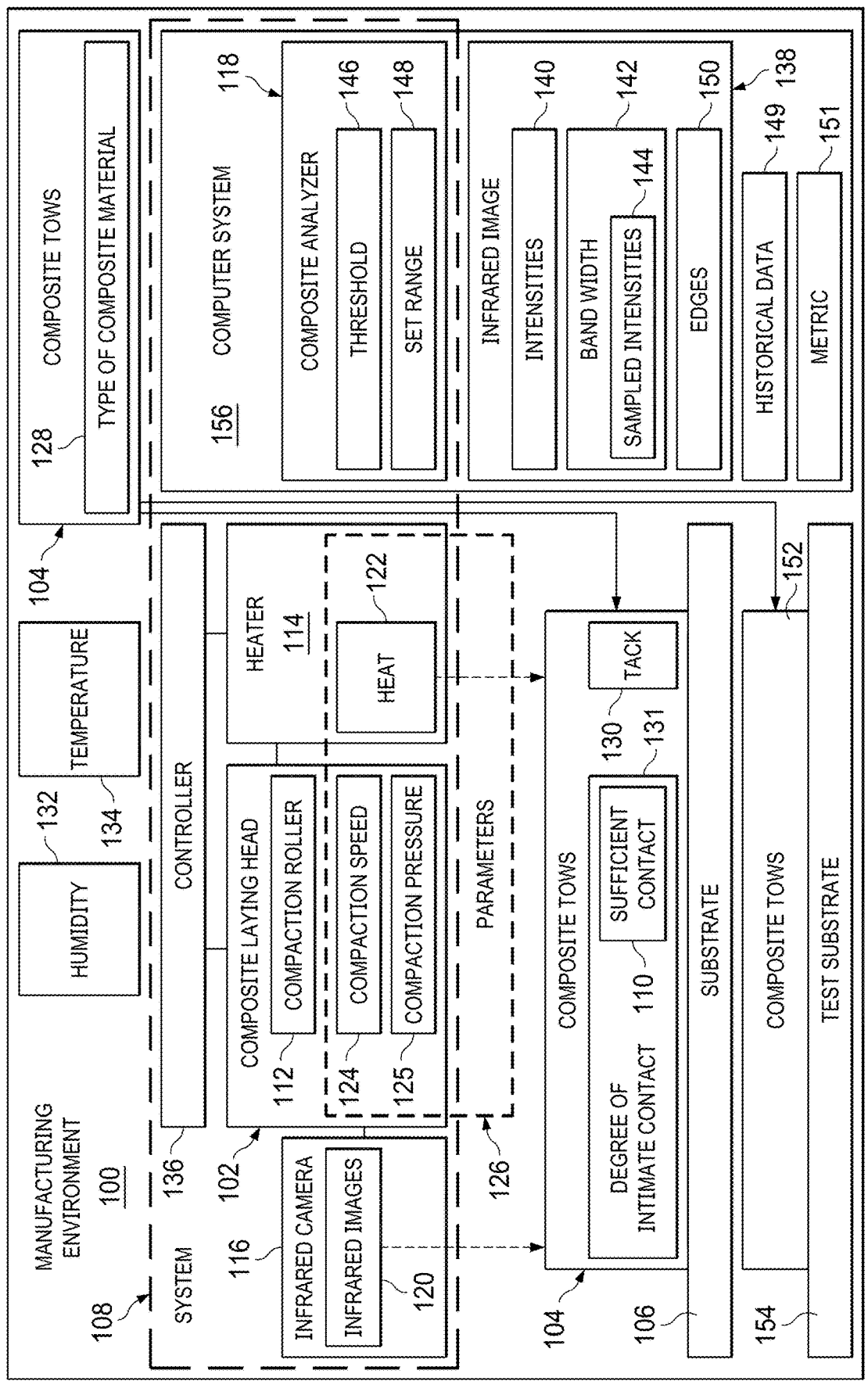
FIG. 1 is an illustration of a block diagram of a manufacturing environment in which composite tows are laid down in accordance with an illustrative embodiment.

Turning now to FIG. 1, an illustration of a block diagram of a manufacturing environment in which composite tows are laid down is depicted in accordance with an illustrative embodiment. In manufacturing environment 100, composite laying head 102 lays down composite tows 104 onto substrate 106. System 108 lays down composite tows 104 and determines whether composite tows 104 have sufficient contact 110. System 108 comprises composite laying head 102 with compaction roller 112, heater 114, infrared camera 116, and composite analyzer 118. Heater 114 is mounted forward of compaction roller 112 to heat substrate 106. Infrared camera 116 is mounted aft of compaction roller 112. Infrared camera 116 is configured to capture infrared images 120 of composite tows 104 laid down on substrate 106 by compaction roller 112. Composite analyzer 118 is configured to determine whether composite tows 104 have sufficient contact 110 using infrared images 120.

The determination may be used to control application of composite tows 104. In some illustrative examples, after determining whether composite tows 104 have sufficient contact 110, application of composite tows 104 is controlled using the results of the determination. For example, at least one of heat 122, compaction speed 124, or compaction pressure 125 may be changed based on the determination.

Heater 114 applies heat 122 to substrate 106. Substrate 106 takes any desirable form. In some illustrative examples, substrate 106 comprises a surface formed of prior layers of composite tows 104. In some illustrative examples, substrate 106 comprises a tool surface.

Compaction roller 112 of composite laying head 102 applies composite tows 104 to substrate 106 at compaction speed 124. Heat 122 compaction speed 124, and compaction pressure 125 are parameters 126 that are adjustable to accomplish sufficient contact 110.

Tack 130 is a description of the strength of the bond between composite tows 104 and substrate 106. Tack 130 is affected by temperature of composite tows 104 laid up on substrate 106. Tack 130 is also affected by contact between composite tows 104 and substrate 106. Tack 130 may be measured in Newtons.

Tack 130 changes as the temperature of composite tows 104 beneath compaction roller 112 changes. For any given compaction speed 124, tack 130 continually changes as temperature of composite tows 104 beneath compaction roller 112 changes. For any given compaction speed 124, tack 130 has a maximum value. For any given compaction speed 124, tack 130 increases to the maximum value as the temperature of composite tows 104 beneath compaction roller 112 increases. After reaching the maximum value for tack 130, increasing temperature of composite tows 104 beneath compaction roller 112 further decreases tack 130. In some illustrative examples, the behavior of tack 130 relative to temperature for any given compaction speed 124 can be represented by a tack reference curve.

Degree of intimate contact 131 changes as the temperature of composite tows 104 beneath compaction roller 112 changes. For any given compaction speed 124, degree of intimate contact 131 between composite tows 104 and substrate 106 increases up to 100% as the temperature of composite tows 104 beneath compaction roller 112 increases. Once degree of intimate contact 131 between composite tows 104 and substrate 106 reaches 100%, increasing temperature does not affect degree of intimate contact 131.

In some illustrative examples, degree of intimate contact 131 between composite tows 104 and substrate 106 reaches 100%, tack 130 may not have reached its maximum value. In these illustrative examples, the temperature beneath compaction roller 112 may be increased to increase tack 130.

As the processing temperature increases for a given compaction speed 124, both degree of intimate contact 131 increases, as does the value of tack 130. At a temperature at or near the maximum value for tack 130, degree of intimate contact 131 becomes 100%. Continuing to increase the temperature results in a lower value of tack 130, while degree of intimate contact 131 remains 100%. Composite analyzer 118 takes into account both the uniformity of intensities in infrared images 120 representative of degree of intimate contact 131, and the value of intensities in infrared images 120 indicative of temperature for determination of at least one of degree of intimate contact 131 or tack 130.

Tack 130 may vary depending upon type of composite material 128, humidity 132 of manufacturing environment 100, and temperature 134 of manufacturing environment 100. Tack 130 may also be affected by storage conditions of composite tows 104, manufacturing conditions for composite tows 104, and laydown time for composite tows 104. Conventional systems do not quantify tack 130.

In conventional systems, an operator visually inspects a composite layer to evaluate degree of intimate contact 131. Tack 130 is not quantified in conventional systems.

Parameters 126 are adjusted based on type of composite material 128. In some illustrative examples, using system 108, parameters 126 are adjusted to accomplish sufficient contact 110. In some illustrative examples, using system 108, parameters 126 are adjusted to change tack 130.

Controller 136 is configured to modify at least one of heat 122 applied to substrate 106, compaction speed 124 of composite laying head 102, or compaction pressure 125 of composite laying head 102 when it is determined that composite tows 104 do not have sufficient contact 110. In some illustrative examples, controller 136 also controls maneuvering composite laying head 102 within manufacturing environment 100. In some illustrative examples, controller 136 is configured to modify at least one of heat 122 applied to substrate 106, compaction speed 124 of composite laying head 102, or compaction pressure 125 of composite laying head 102 to change tack 130.

In some illustrative examples, composite analyzer 118 is configured to determine whether composite tows 104 have sufficient contact 110 in real-time. In some illustrative examples, composite analyzer 118 is configured to determine whether composite tows 104 have sufficient contact 110 as part of an inspection sampling plan.

In some illustrative examples, composite analyzer 118 analyzes each of infrared images 120 to determine whether composite tows 104 have sufficient contact 110 as composite tows 104 are laid down on substrate 106. In some illustrative examples, composite analyzer 118 analyzes only a portion of infrared images 120.

Infrared image 138 is one of infrared images 120. Infrared image 138 has pixels with intensities 140. Intensities 140 are representative of temperatures of each of the locations of composite tows 104 visible in infrared image 138.

When composite tows 104 are laid down onto substrate 106, the temperature of composite tows 104 is lower than substrate 106. In some illustrative examples, when composite tows 104 are laid down onto substrate 106, the temperature of composite tows 104 is lower than temperature 134 of manufacturing environment 100.

Infrared camera 116 is positioned and directed behind compaction roller 112. The temperature of composite tows 104 in infrared images 120 will be lower that at the point of compaction, beneath compaction roller 112. The difference between the temperature of composite tows 104 when imaged by infrared camera and the temperature of composite tows 104 when compacted by compaction roller 112 that can be accounted for during processing of the data.

Infrared images 120 provided by infrared camera 116 enables evaluation of degree of intimate contact and evaluation of tack 130. The uniformity of material temperature in composite tows 104 behind compaction roller 112 is indicative of the degree of intimate contact. The actual temperature of composite tows 104 in infrared images 120 defines the actual value of tack 130.

When composite tows 104 are laid down onto substrate 106, substrate 106 heats composite tows 104 on substrate 106. Heat is conducted from substrate 106 to composite tows 104 laid down onto substrate 106.

Intensities 140 are indicative of the amount of heat conducted to composite tows 104. Intensities 140 are indicative of the level of contact between composite tows 104 and substrate 106. With greater amounts of contact between composite tows 104 and substrate 106, greater amounts of heat transfer occur.

In some illustrative examples, determining whether composite tows 104 have sufficient contact 110 using infrared images 120 comprises sampling intensities 140 across band width 142 of composite tows 104 to form sampled intensities 144. Sampled intensities 144 has a range from a lowest intensity to a highest intensity of sampled intensities 144. In some illustrative examples, determining whether composite tows 104 have sufficient contact 110 using infrared images 120 further comprises determining if a value of the range of sampled intensities 144 is greater than threshold 146. In some illustrative examples, if a value of the range of sampled intensities 144 is greater than threshold 146, it is determined that composite tows 104 do not have sufficient contact 110. In some illustrative examples, if a value of the range of sampled intensities 144 is greater than threshold 146, infrared image 138 is identified for further review.

In some illustrative examples, determining whether composite tows 104 have sufficient contact 110 using infrared images 120 further comprises determining if any of sampled intensities 144 is greater than or less than set range 148. In some illustrative examples, if any of sampled intensities 144 is lower than set range 148, it is determined that composite tows 104 do not have sufficient contact 110. If any of sampled intensities 144 is lower than set range 148, heat 122 may be increased. If any of sampled intensities 144 is higher than set range 148, heat 122 may be decreased.

To determine a degree to which heat 122 will be changed, current conditions for laying down composite tows 104 are taken into account. For example, to determine a degree to which heat 122 will be changed, machine speeds and maximum tack for composite tows 104, parameters for composite laying head 102, and conditions of manufacturing environment 100 are taken into account. In some illustrative examples, at least one of humidity 132, temperature 134, compaction pressure 125 for composite laying head 102, tow tension in composite laying head 102, and compaction speed 124 are taken into account to determine a degree to which heat 122 will be changed.

To determine a degree to which heat 122 will be changed, historical data 149 is taken into account. Historical data 149 includes at least one of manufacturing environment humidity, manufacturing environment temperature, a type of composite material, heat applied, compaction speed, compaction pressure, tack, and intensity data from infrared images.

Threshold 146 and set range 148 are selected using any desirable method. In some illustrative examples, threshold 146 and set range 148 are selected based on known reference standards for type of composite material 128. Data for the known reference standards includes at least one of infrared images during lay-up, ultrasound inspection data, or visual inspection data. In some illustrative examples, threshold 146 and set range 148 are selected based on tack reference curves for the type of composite material 128.

In some illustrative examples, determining whether composite tows 104 have sufficient contact 110 using infrared images 120 comprises identifying edges 150 for at least one of composite tows 104. In some illustrative examples, if edges 150 are visible for at least one of composite tows 104, sufficient contact 110 is not present. In some illustrative examples, if edges 150 are visible for at least one of composite tows 104, heat 122 is increased.

In some illustrative examples, composite analyzer 118 determines if sufficient contact 110 is present without quantifying contact between composite tows 104 and substrate 106. In some illustrative examples, composite analyzer 118 quantifies degree of intimate contact 131 between composite tows 104 and substrate 106. In some illustrative examples, composite analyzer 118 determines if sufficient contact 110 is present based on a determined value of degree of intimate contact 131 between composite tows 104 and substrate 106. In some illustrative examples, composite analyzer 118 quantifies degree of intimate contact 131 between composite tows 104 and substrate 106 after determining if sufficient contact 110 is present.

In some illustrative examples, composite analyzer 118 is further configured to determine a level of tack 130. In some illustrative examples, composite analyzer 118 is configured to determine a level of tack 130 using infrared images 120. In some illustrative examples, composite analyzer 118 is further configured to determine a level of tack 130 using at least one of infrared images 120, degree of intimate contact 131 of composite tows 104, and metric 151. In some illustrative examples, composite analyzer 118 may also take into account at least one of an amount of heat 122 applied by heater 114, humidity 132 in manufacturing environment 100, type of composite material 128, or temperature 134 of manufacturing environment 100.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

In some illustrative examples, tack 130 of composite tows 104 is determined when infrared image 138 is identified for further review. In some illustrative examples, tack 130 of composite tows 104 is determined after determining whether composite tows 104 have sufficient contact 110 using infrared images 120.

In some illustrative examples, intensities 140 are compared to or analyzed relative to metric 151. Metric 151 relates tack 130 to intensities of infrared images. Intensities of infrared images are representative of temperatures within the infrared images. Metric 151 takes into account historical data 149 from laying down composite tows. In some illustrative examples, metric 151 takes the form of any number of tack reference curves.

Metric 151 may be used for any desired analysis. Metric 151 may be used in combination with any other desired data. In some illustrative examples, metric 151 is used to set at least one of threshold 146 or set range 148. In some illustrative examples, metric 151 is used to determine a degree to which heat 122 will be changed. In some illustrative examples, metric 151 is used, in conjunction with heat 122 and intensities 140, to determine tack 130. In some illustrative examples, metric 151 is used, in conjunction with a determined degree of intimate contact 131 of composite tows 104 and intensities 140, to determine tack 130.

In some illustrative examples, substrate 106 is a production substrate. In these illustrative examples, composite tows 104 generate a part in production.

In other illustrative examples, composite laying head 102 lays down composite tows 152 on test substrate 154. When composite laying head 102 lays down composite tows 152 on test substrate 154, tack 130 determined by composite analyzer 118 for composite tows 152 is used to determine heat 122, compaction speed 124, and compaction pressure 125 to lay down composite tows 104 on substrate 106 after laying composite tows 152 on test substrate 154.

Infrared camera 116 is positioned in any desirable location to image composite tows 104 after being laid down onto substrate 106. It is desirable to keep infrared camera 116 as normal to a surface of substrate 106 as possible. Some components of composite laying head 102 may block a view of composite tows 104 just behind compaction roller 112. In some illustrative examples, some components of composite laying head 102 block a field of view of about 3 inches behind compaction roller 112. Infrared camera 116 is positioned in a most desirable position taking into account the blocked field of view and a desire for normality of infrared camera 116. Infrared camera 116 is positioned to contain band width 142 of composite tows 104. Infrared camera 116 is desirably positioned to have a best resolution possible while containing band width 142.

The illustration of manufacturing environment 100 in FIG. 1 is not meant to imply physical or architectural limitations to the manner in which an illustrative example may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative example.

For example, as depicted, historical data 149, infrared image 138, and composite analyzer 118 are all present on computer system 156. In some illustrative examples, at least one of historical data 149, infrared image 138, or composite analyzer 118 may be present on a different computer system. As another example, although computer system 156 is depicted within manufacturing environment 100, computer system 156 may be present in any desirable location. In some illustrative examples, computer system 156 is present outside of manufacturing environment 100.

As yet another example, although sufficient contact 110 is discussed, system 108 may be used to identify a variety of different inconsistencies. For example, system 108 may be used to identify cut tows, laps, gaps, dropped tows, missing tows, puckers, or any other types of inconsistencies. In some illustrative examples, other inconsistencies are filtered out of infrared image 138 prior to determining if composite tows 104 have sufficient contact 110.

Figure 2:
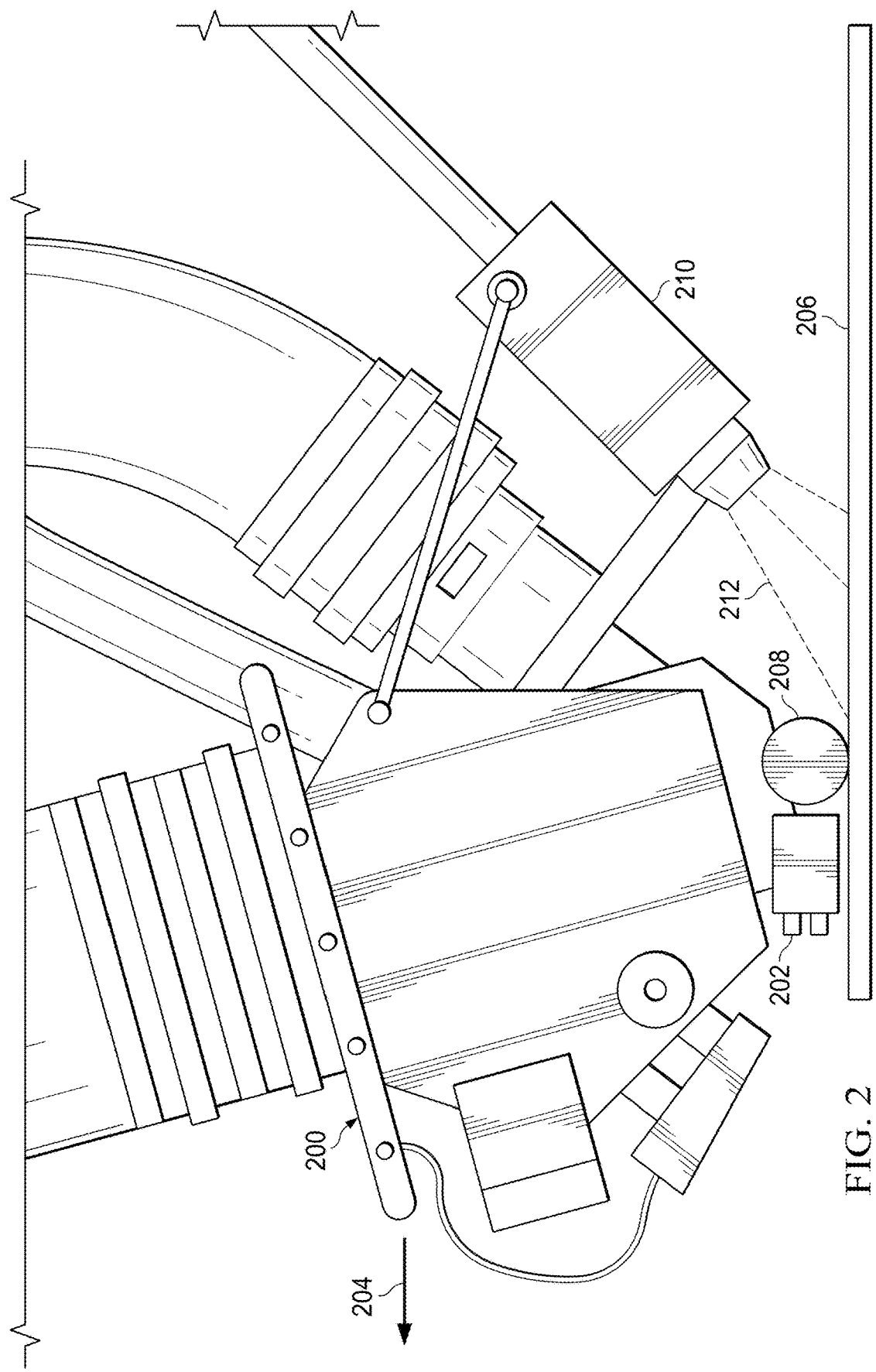
FIG. 2 is an illustration of a side view of a composite laying head and attached infrared camera in accordance with an illustrative embodiment.

Turning now to FIG. 2, an illustration of a side view of a composite laying head and attached infrared camera is depicted in accordance with an illustrative embodiment. Composite laying head 200 is a depiction of composite laying head 102 of FIG. 1. Heater 202 is a depiction of heater 114 of FIG. 1.

As depicted, composite laying head 200 moves in direction 204 to lay down composite tows (not depicted) on substrate 206. As composite laying head 200 moves in direction 204, heater 202 heats substrate 206 prior to the composite tows being laid down onto substrate 206 by compaction roller 208.

Infrared camera 210 is mounted aft of compaction roller 208. Infrared camera 210 is directed at location 212 on substrate 206. Infrared camera 210 is positioned and directed behind compaction roller 208. The temperature of composite tows in infrared images taken by infrared camera 210 will be lower that at the point of compaction, beneath compaction roller 208. The difference between the temperature of composite tows when imaged by infrared camera 210 and the temperature of composite tows when compacted by compaction roller 208 that can be accounted for during processing of the data.

Infrared images from infrared camera 210 can be used to evaluate and quantify at least one of a degree of intimate contact and a value of tack of composite tows laid down by composite laying head 200. The degree of intimate contact and the value of tack are both affected by the temperature of the composite tows. The intensities within the infrared images taken by infrared camera 210 are representative of temperatures of the composite tows.

Figure 3:
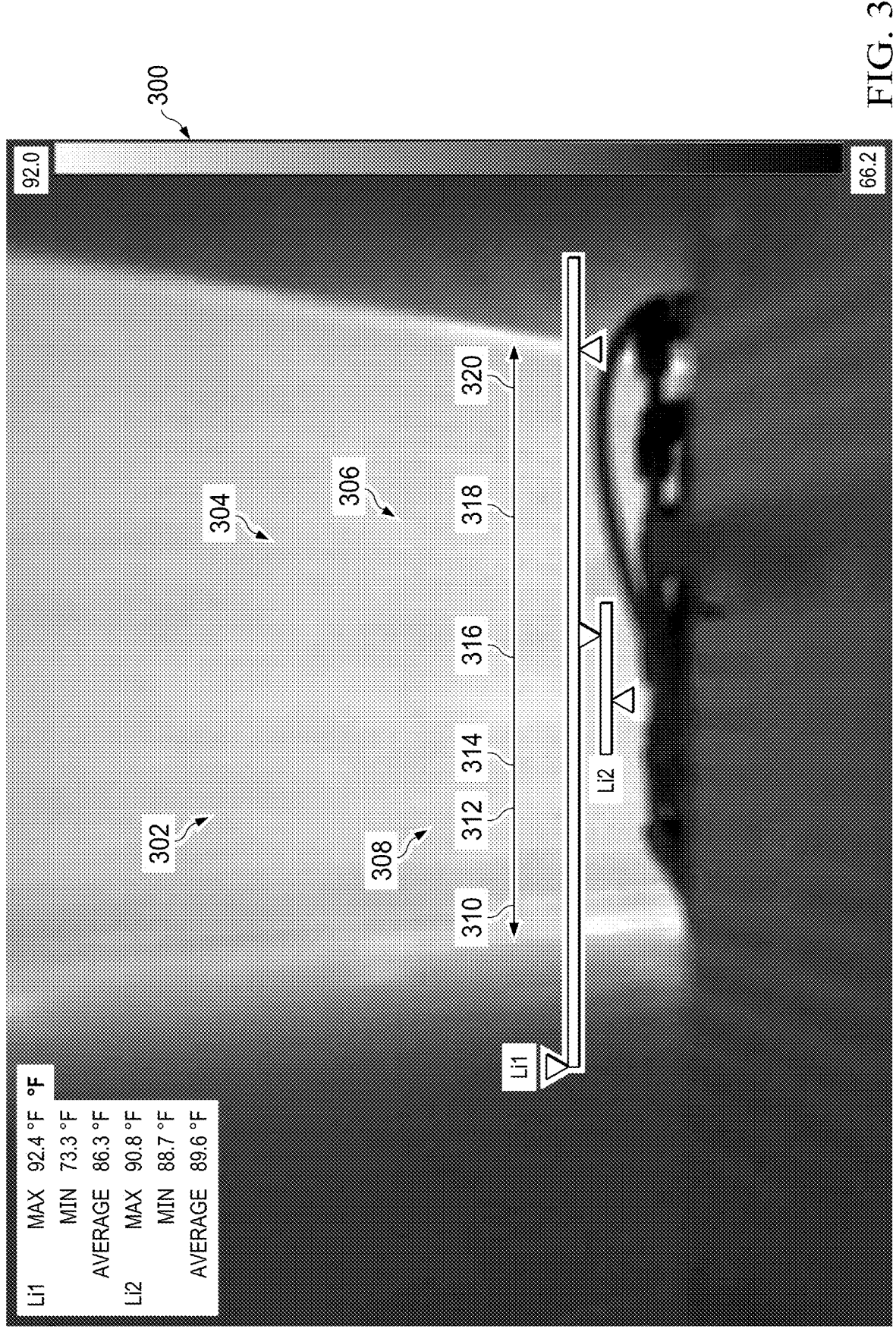
FIG. 3 is an illustration of an infrared image of composite tows in accordance with an illustrative embodiment.

Turning now to FIG. 3, an illustration of an infrared image of composite tows is depicted in accordance with an illustrative embodiment. Infrared image 300 is a physical implementation of one of infrared images 120 of FIG. 1. Infrared image 300 may be a physical implementation of an infrared image generated by infrared camera 210 of FIG. 2.

In infrared image 300, composite tows 302 have sufficient contact 304. In infrared image 300, composite tows 302 may be described as "tacked." In some illustrative examples, infrared image 300 is used to determine if composite tows 302 have sufficient contact 304 in real-time. In these illustrative examples, the determination is used to control parameters of the lay down process including at least one of heat and compaction speed. As composite tows 302 have sufficient contact 304, heat and compaction speed of the composite laying head are maintained.

In some illustrative examples, infrared image 300 is used to determine if composite tows 302 have sufficient contact 304 as a post-processing inspection. In these illustrative examples, the determination is used to inform a decision regarding potential rework. If composite tows 302 did not have sufficient contact 304, a section of a composite structure containing composite tows 302 visible in infrared image 300 may be reworked.

In some illustrative examples, to determine if composite tows 302 have sufficient contact 304, a composite analyzer, such as composite analyzer 118 of FIG. 1, samples intensities in band width 306. In some illustrative examples, all intensities within band width 306 are selected. In some illustrative examples, a set quantity of intensities is taken along band width 306.

As depicted, sampled intensities 308 are present along band width 306. Sampled intensities 308 include intensity 310, intensity 312, intensity 314, intensity 316, intensity 318, and intensity 320. In some illustrative examples, using sampled intensities 308 of band width 306, it is determined if a value of a range of the sampled intensities is greater than a threshold. For example, a difference between a highest intensity and a lowest intensity from sampled intensities 308 is the value of the range. If the value of the range is too large, areas of insufficient contact may be present.

In some illustrative examples, using sampled intensities 308 of band width 306, it is determined if any of sampled intensities 308 is greater than or less than a set range. The set range may be a desirable range of intensities for sufficient contact.

In some illustrative examples, to determine if composite tows 302 have sufficient contact 304, edges are identified for at least one of composite tows 302. Edges are not visible in infrared image 300.

In some illustrative examples, after determining if composite tows 302 have sufficient contact, a level of tack is determined using infrared image 300. In some illustrative examples, temperatures within infrared image 300 are determined. In some illustrative examples, the determined temperatures are used in conjunction with a metric, such as tack reference curves, to determine a level of tack. In some illustrative examples, the level of tack is determined using at least one of intensities of infrared image 300, determined degree of intimate contact of composite tows 302, or a metric relating tack to intensities of infrared images.

In some illustrative examples, a level of tack is determined using infrared image 300 in response to determining a degree of intimate contact in infrared image 300. In some illustrative examples, a level of tack is determined taking into account other data such as heat applied to the substrate or any other desirable data points.

Figure 4:
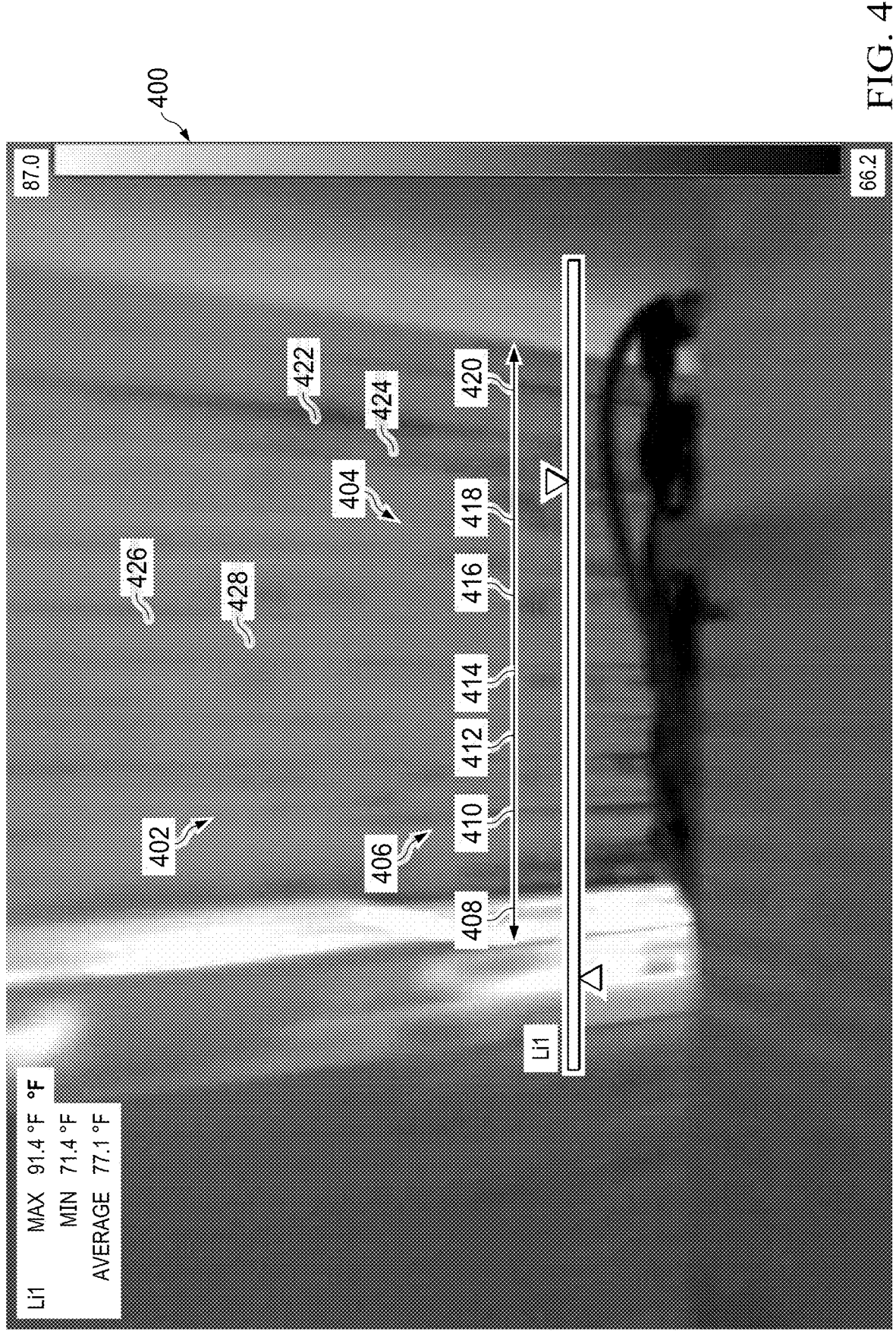
FIG. 4 is an illustration of an infrared image of composite tows in accordance with an illustrative embodiment.

Turning now to FIG. 4, an illustration of an infrared image of composite tows is depicted in accordance with an illustrative embodiment. Infrared image 400 is a physical implementation of one of infrared images 120 of FIG. 1. Infrared image 400 may be a physical implementation of an infrared image generated by infrared camera 210 of FIG. 2.

In infrared image 400, composite tows 402 are only lightly tacked. In infrared image 400, composite tows 402 would pass conventional visual inspection of composite tows 402. In infrared image 400 it is apparent that composite tows 402 may not have sufficient contact for some applications. In infrared image 400 composite tows 402 may have sufficient contact for some applications and some structures. In infrared image 400, sections of differing intensities are visible to an operator and detectable by image analysis.

In some illustrative examples, infrared image 400 is used to determine if composite tows 402 have sufficient contact in real-time. In these illustrative examples, the determination is used to control parameters of the lay down process including at least one of heat and compaction speed. If composite tows 402 do not have sufficient contact, at least one of heat or compaction speed of the composite laying head may be changed. In some illustrative examples, heat is increased to improve intimate contact of the composite tows. In some illustrative examples, heat is increased to improve a level of tack.

In some illustrative examples, infrared image 400 is used to determine if composite tows 402 have sufficient contact as a post-processing inspection. In these illustrative examples, infrared image 400 may replace conventional visual inspection of composite tows 402. In these illustrative examples, total production time is reduced by eliminating an inspection step. In these illustrative examples, the determination is used to inform a decision regarding potential rework. If composite tows 402 do not have sufficient contact, a section of a composite structure containing composite tows 402 visible in infrared image 400 may be reworked.

In some illustrative examples, to determine if composite tows 402 have sufficient contact, a composite analyzer, such as composite analyzer 118 of FIG. 1, samples intensities in band width 404. In some illustrative examples, all intensities within band width 404 are selected. In some illustrative examples, a set quantity of intensities is taken along band width 404.

As depicted, sampled intensities 406 are present along band width 404. Sampled intensities 406 include intensity 408, intensity 410, intensity 412, intensity 414, intensity 416, intensity 418, and intensity 420. In some illustrative examples, using sampled intensities 406 of band width 404, it is determined if a value of a range of the sampled intensities is greater than a threshold. For example, a difference between a highest intensity and a lowest intensity from sampled intensities 406 is the value of the range. If the value of the range is too large, areas of insufficient contact may be present.

In some illustrative examples, the value of the range of sampled intensities 406 in infrared image 400 is undesirably large. In some illustrative examples, the value of the range of sampled intensities 406 in infrared image 400 is at or under a threshold.

The threshold is selected using any desirable criteria. The threshold is selected using known reference standards. In some illustrative examples, the threshold is selected based on standards or requirements of the resulting part.

In some illustrative examples, using sampled intensities 406 of band width 404, it is determined if any of sampled intensities 406 is greater than or less than a set range. The set range may be a desirable range of intensities for sufficient contact.

The set range is selected using known reference standards. In some illustrative examples, the set range is selected based on standards or requirements of the resulting part.

Depending upon the set range, in some illustrative examples, at least one of intensity 408, intensity 410, intensity 412, intensity 414, intensity 416, intensity 418, and intensity 420 of infrared image 400 is lower than a set range for sufficient contact. Depending upon the set range, each of intensity 408, intensity 410, intensity 412, intensity 414, intensity 416, intensity 418, and intensity 420 of infrared image 400 is within a set range for sufficient contact.

In some illustrative examples, to determine if composite tows 402 have sufficient contact, edges are identified for at least one of composite tows 402. Edges are visible in infrared image 400. For example, edge 422 of composite tow 424 is visible. Edge 426 of composite tow 428 is also visible in infrared image 400.

In some illustrative examples, after determining if composite tows 402 have sufficient contact, a level of tack is determined using infrared image 400. In some illustrative examples, temperatures within infrared image 400 are determined. In some illustrative examples, the determined temperatures are used in conjunction with a metric, such as tack reference curves, to determine a level of tack. In some illustrative examples, the level of tack is determined using at least one of intensities of infrared image 400, determined degree of intimate contact of composite tows 402, or a metric relating tack to intensities of infrared images.

In some illustrative examples, a level of tack is determined using infrared image 400 in response to infrared image 400 being flagged for further analysis. In some illustrative examples, a level of tack is determined taking into account other data such as heat applied to the substrate or any other desirable data points.

Figure 5:
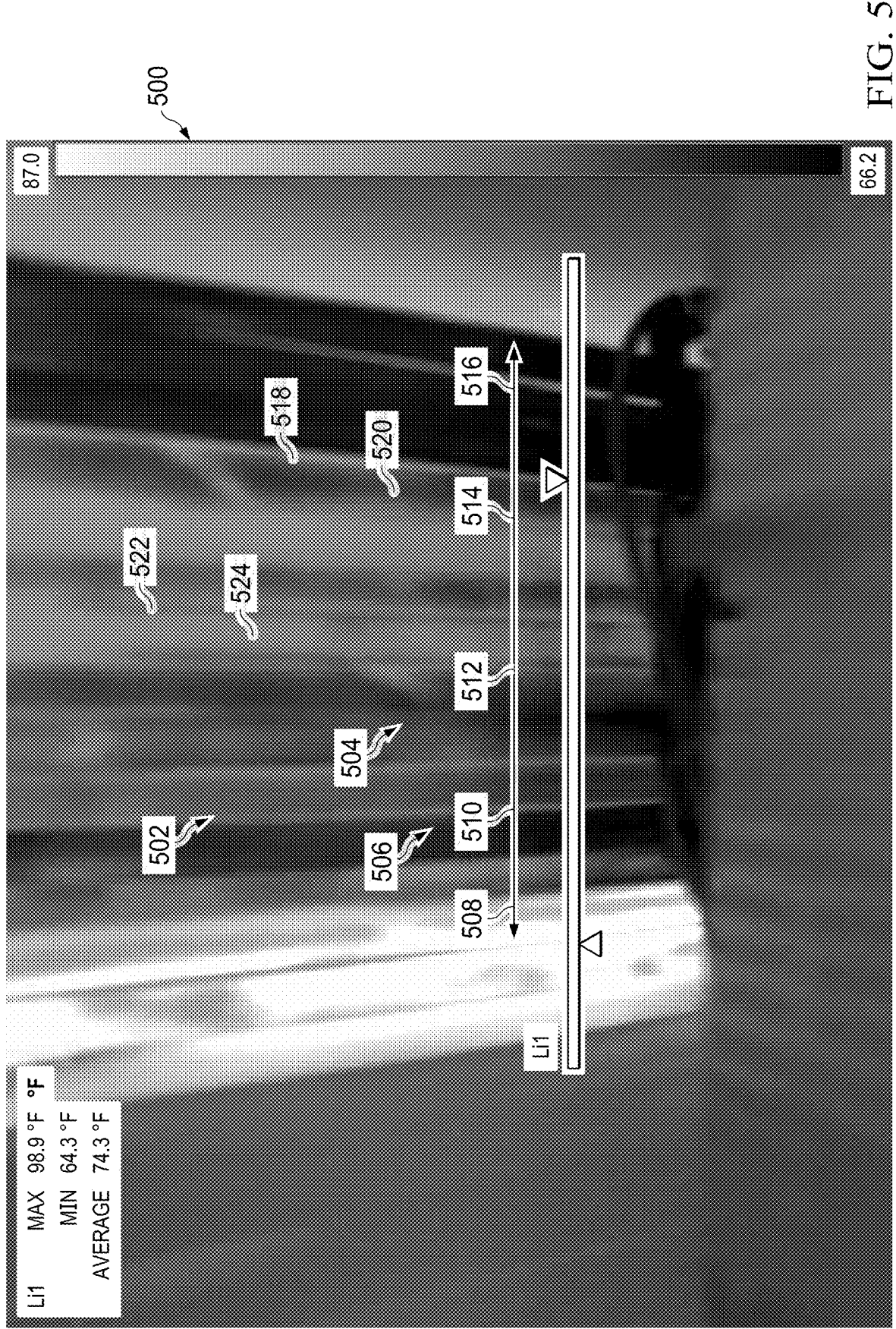
FIG. 5 is an illustration of an infrared image of composite tows in accordance with an illustrative embodiment.

Turning now to FIG. 5, an illustration of an infrared image of composite tows is depicted in accordance with an illustrative embodiment. Infrared image 500 is a physical implementation of one of infrared images 120 of FIG. 1. Infrared image 500 may be a physical implementation of an infrared image generated by infrared camera 210 of FIG. 2.

In infrared image 500, composite tows 502 do not have sufficient intimate contact. In infrared image 500, composite tows 502 would not pass conventional visual inspection of composite tows 502. In infrared image 500, composite tows 502 would be detected as untacked tows in a conventional visual inspection. In infrared image 500 it is apparent that composite tows 502 do not have sufficient contact. The dark areas of infrared image 500 represent areas of insufficient contact. The dark areas of infrared image 500 are areas of colder temperatures of composite tows 502.

In some illustrative examples, infrared image 500 is used to determine if composite tows 502 have sufficient contact in real-time. In these illustrative examples, the determination is used to control parameters of the lay down process including at least one of heat and compaction speed. As composite tows 502 do not have sufficient contact, at least one of heat or compaction speed of the composite laying head may be changed. In some illustrative examples, heat is increased to improve intimate contact of the composite tows. In some illustrative examples, heat is increased to improve a level of tack.

In some illustrative examples, laying down of composite tows 502 is stopped based on infrared image 500. In these illustrative examples, composite tows 502 may be removed and the area of the structure is reworked. In these illustrative examples, determining if sufficient contact is present using infrared image 500 may reduce production time. For example, determining if sufficient contact is present using infrared image 500 and reworking prior to completing the entirety of a layer of composite tows may eliminate time laying down composite tows that will be removed.

In some illustrative examples, infrared image 500 is used to determine if composite tows 502 have sufficient contact as a post-processing inspection. In these illustrative examples, infrared image 500 may replace conventional visual inspection of composite tows 502. In these illustrative examples, total production time is reduced by eliminating an inspection step. In these illustrative examples, the determination is used to inform a decision regarding potential rework. Composite tows 502 do not have sufficient contact, a section of a composite structure containing composite tows 502 visible in infrared image 500 may be reworked.

In some illustrative examples, to determine if composite tows 502 have sufficient contact, a composite analyzer, such as composite analyzer 118 of FIG. 1, samples intensities in band width 504. In some illustrative examples, all intensities within band width 504 are selected. In some illustrative examples, a set quantity of intensities is taken along band width 504.

As depicted, sampled intensities 506 are present along band width 504. Sampled intensities 506 include intensity 508, intensity 510, intensity 512, intensity 514, and intensity 516. In some illustrative examples, using sampled intensities 506 of band width 504, it is determined if a value of a range of the sampled intensities is greater than a threshold. For example, a difference between a highest intensity and a lowest intensity from sampled intensities 506 is the value of the range. If the value of the range is too large, areas of insufficient contact may be present. The value of the range of sampled intensities 506 in infrared image 500 is undesirably large.

The threshold is selected using any desirable criteria. The threshold is selected using known reference standards. In some illustrative examples, the threshold is selected based on standards or requirements of the resulting part.

In some illustrative examples, using sampled intensities 506 of band width 504, it is determined if any of sampled intensities 506 is greater than or less than a set range. The set range may be a desirable range of intensities for sufficient contact.

The set range is selected using known reference standards. In some illustrative examples, the set range is selected based on standards or requirements of the resulting part. As depicted at least one of intensity 508, intensity 510, intensity 512, intensity 514, or intensity 516 of infrared image 500 is lower than a set range for sufficient contact.

In some illustrative examples, to determine if composite tows 502 have sufficient contact, edges are identified for at least one of composite tows 502. Edges are visible in infrared image 500. For example, edge 518 of composite tow 520 is visible. Edge 522 of composite tow 524 is also visible in infrared image 500.

Figure 6:
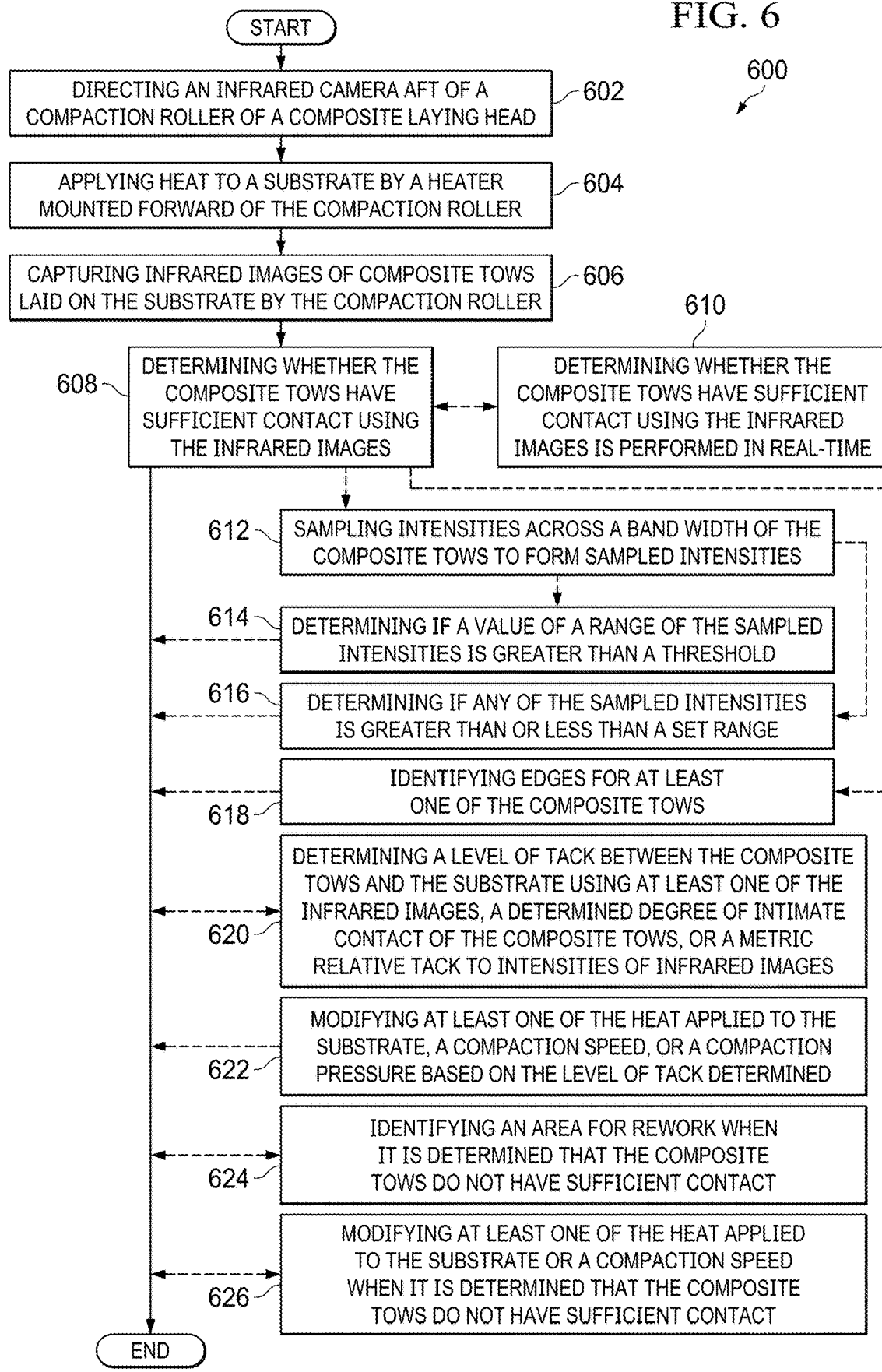
FIG. 6 is an illustration of a flowchart of a method for determining whether composite tows have sufficient contact in accordance with an illustrative embodiment.

Turning now to FIG. 6, an illustration of a flowchart of a method for determining whether composite tows have sufficient contact is depicted in accordance with an illustrative embodiment. Method 600 may determine whether composite tows 104 have sufficient contact 110 of FIG. 1. Method 600 may determine whether composite tows laid down by composite laying head 200 have sufficient contact. Method 600 may be used to capture and use infrared image 300, infrared image 400, or infrared image 500 to determine whether composite tows have sufficient contact.

Method 600 directs an infrared camera aft of a compaction roller of a composite laying head (operation 602). Method 600 applies heat to a substrate by a heater mounted forward of the compaction roller (operation 604). Method 600 captures infrared images of composite tows laid down on the substrate by the compaction roller (operation 606). In some illustrative examples, capturing the infrared images of the composite tows laid down on the substrate is performed by an infrared camera mounted aft of the compaction roller. Method 600 determines whether the composite tows have sufficient contact using the infrared images (operation 608). Afterwards, method 600 terminates.

In some illustrative examples, determining whether the composite tows have sufficient contact using the infrared images is performed in real-time (operation 610). When the determination is performed in real-time, the determination may be used to modify parameters of the laydown process to improve intimate contact.

In some illustrative examples, determining whether the composite tows have sufficient contact using the infrared images comprises sampling intensities across a band width of the composite tows to form sampled intensities (operation 612). In some illustrative examples, method 600 determines if a value of a range of the sampled intensities is greater than a threshold (operation 614). The threshold is selected based on any desirable criteria. In some illustrative examples, the threshold is selected using known reference standards. In some illustrative examples, the threshold is selected based on standards or requirements of the resulting composite part that includes the composite tows.

In some illustrative examples, method 600 determines if any of the sampled intensities is greater than or less than a set range (operation 616). The set range is selected based on any desirable criteria. In some illustrative examples, the set range is selected using known reference standards. In some illustrative examples, the set range is selected based on standards or requirements of the resulting composite part that includes the composite tows.

In some illustrative examples, determining whether the composite tows have sufficient contact using the infrared images comprises identifying edges for at least one of the composite tows (operation 618). In some illustrative examples, when edges are visible contact is insufficient.

In some illustrative examples, method 600 determines a level of tack between the composite tows and the substrate using at least one of the infrared images, a determined degree of intimate contact of the composite tows, or a metric relating tack to intensities of infrared images. (operation 620). In some illustrative examples, method 600 modifies at least one of the heat applied to the substrate, a compaction speed, or a compaction pressure based on the level of tack determined (operation 622).

In some illustrative examples, method 600 identifies an area for rework when it is determined that the composite tows do not have sufficient contact (operation 624). In some illustrative examples, method 600 modifies at least one of the heat applied to the substrate, a compaction speed, or a compaction pressure when it is determined that the composite tows do not have sufficient contact (operation 626).

In some illustrative examples method 600 increases desirable characteristics of a resulting composite part by controlling intimate contact of composite tows during layup. In some illustrative examples method 600 reduces production time by replacing a conventional inspection step. In some illustrative examples method 600 reduces production time by stopping layup of composite tows prior to completing a complete layer of the composite tows.

Figure 7:
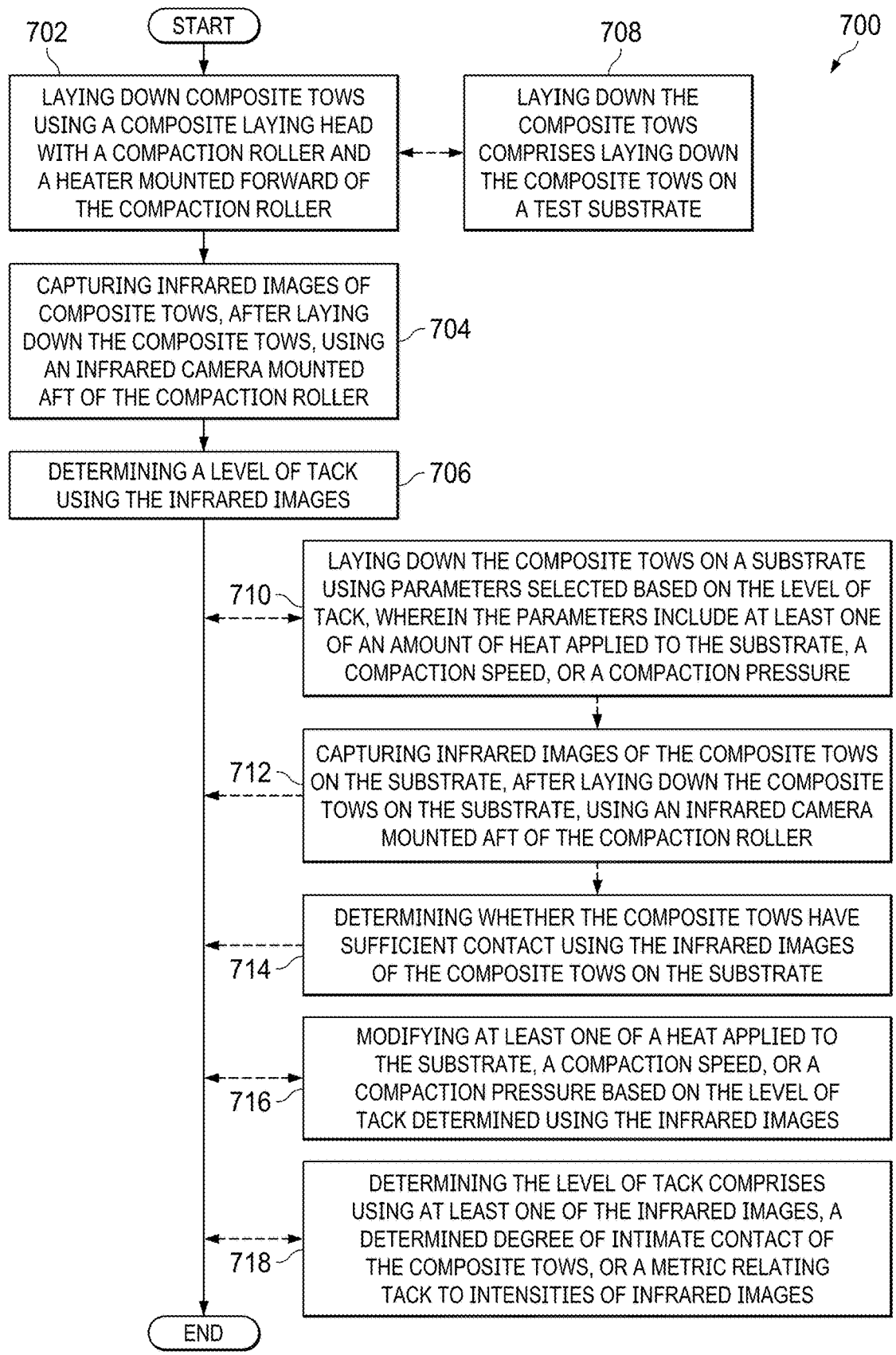
FIG. 7 is an illustration of a flowchart of a method for determining a level of tack in accordance with an illustrative embodiment.

Turning now to FIG. 7, an illustration of a flowchart of a method for determining a level of tack is depicted in accordance with an illustrative embodiment. Method 700 may determine whether composite tows 104 have sufficient contact 110 of FIG. 1. Method 700 may determine whether composite tows laid down by composite laying head 200 have sufficient contact. Method 700 may be used to capture and use infrared image 300, infrared image 400, or infrared image 500 to determine whether composite tows have sufficient contact.

Method 700 lays down composite tows using a composite laying head with a compaction roller and a heater mounted forward of the compaction roller (operation 702). Method 700 captures infrared images of composite tows, after laying down the composite tows, using an infrared camera mounted aft of the compaction roller (operation 704). Method 700 determines a level of tack using the infrared images (operation 706). Afterwards, method 700 terminates.

In some illustrative examples, laying down the composite tows comprises laying down the composite tows on a test substrate (operation 708). When composite tows are laid down on a test substrate, parameters of the laying down, such as heat, compaction speed, and compaction pressure, may be used to lay down a production layup with the same material.

In some illustrative examples, method 700 lays down the composite tows on a substrate using parameters selected based on the level of tack, wherein the parameters include at least one of an amount of heat applied to the substrate, a compaction speed, or a compaction pressure (operation 710). In some illustrative examples, method 700 further captures infrared images of composite tows on the substrate, after laying down the composite tows on the substrate, using an infrared camera mounted aft of the compaction roller (operation 712). In some illustrative examples, method 700 further determines whether the composite tows have sufficient contact using the infrared images of the composite tows on the substrate (operation 714).

In some illustrative examples, method 700 modifies at least one of a heat applied to the substrate, a compaction speed, or a compaction pressure based on the level of tack determined using the infrared images (operation 716). In some illustrative examples, method 700 determines the level of tack comprises determining the level of tack using at least one of the infrared images, a determined degree of intimate contact of the composite tows, or a metric relating tack to intensities of infrared images. (operation 718).

In some illustrative examples method 700 increases desirable characteristics of a resulting composite part by controlling intimate contact of composite tows during layup. In some illustrative examples method 700 reduces production time by replacing a conventional inspection step. In some illustrative examples method 700 reduces production time by stopping layup of composite tows prior to completing a complete layer of the composite tows.

The flowcharts and block diagrams in the different depicted examples illustrate the architecture, functionality, and operation of some possible implementations of apparatus and methods in an illustrative example. In this regard, each block in the flowcharts or block diagrams may represent a module, a segment, a function, and/or a portion of an operation or step.

In some alternative implementations of an illustrative example, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

In some illustrative examples, not all blocks of method 600 or method 700 are performed. For example, operations 610 through 626 of FIG. 6 may be optional. As another example, operations 708 through 718 of FIG. 7 may be optional.

Figure 8:
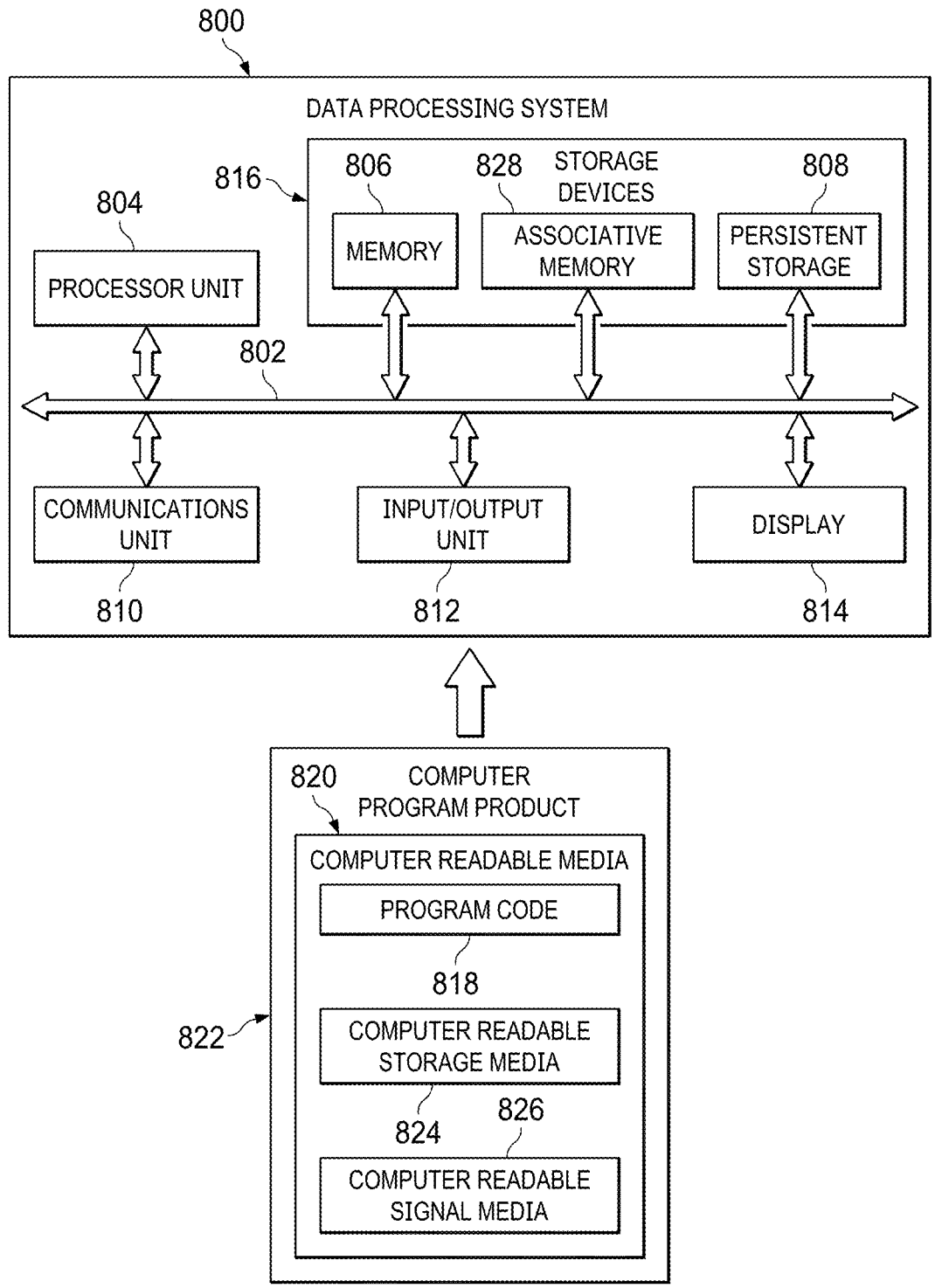
FIG. 8 is an illustration of a data processing system in the form of a block diagram in accordance with an illustrative embodiment.

Turning now to FIG. 8, an illustration of a data processing system in the form of a block diagram is depicted in accordance with an illustrative embodiment. Data processing system 800 may be used to implement computer system 156 including composite analyzer 118 in FIG. 1. In this illustrative example, data processing system 800 includes communications framework 802, which provides communications between processor unit 804, memory 806, persistent storage 808, communications unit 810, input/output (I/O) unit 812, and display 814. In this example, communications framework 802 may take the form of a bus system.

Processor unit 804 serves to execute instructions for software that may be loaded into memory 806. Processor unit 804 may be a number of processors, a multi-processor core, or some other type of processor, depending on the particular implementation.

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer readable storage devices in these illustrative examples. Memory 806, in these examples, may be, for example, a random-access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a solid state hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that may be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs may be located in storage devices 816, which are in communication with processor unit 804 through communications framework 802. The processes of the different examples may be performed by processor unit 804 using computer-implemented instructions, which may be located in a memory, such as memory 806.

These instructions are referred to as program code, computer usable program code, or computer readable program code that may be read and executed by a processor in processor unit 804. The program code in the different examples may be embodied on different physical or computer readable storage media, such as memory 806 or persistent storage 808.

Program code 818 is located in a functional form on computer readable media 820 that is selectively removable and may be loaded onto or transferred to data processing system 800 for execution by processor unit 804. Program code 818 and computer readable media 820 form computer program product 822 in these illustrative examples. In the illustrative example, computer readable media 820 is computer readable storage media 824.

In these illustrative examples, computer readable storage media 824 is a physical or tangible storage device used to store program code 818 rather than a medium that propagates or transmits program code 818.

Alternatively, program code 818 may be transferred to data processing system 800 using a computer readable signal media. The computer readable signal media may be, for example, a propagated data signal containing program code 818. For example, the computer readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 800 are not meant to provide architectural limitations to the manner in which different examples may be implemented. The different illustrative examples may be implemented in a data processing system including components in addition to or in place of those illustrated for data processing system 800. Other components shown in FIG. 8 can be varied from the illustrative examples shown. The different examples may be implemented using any hardware device or system capable of running program code 818.

Figure 9:
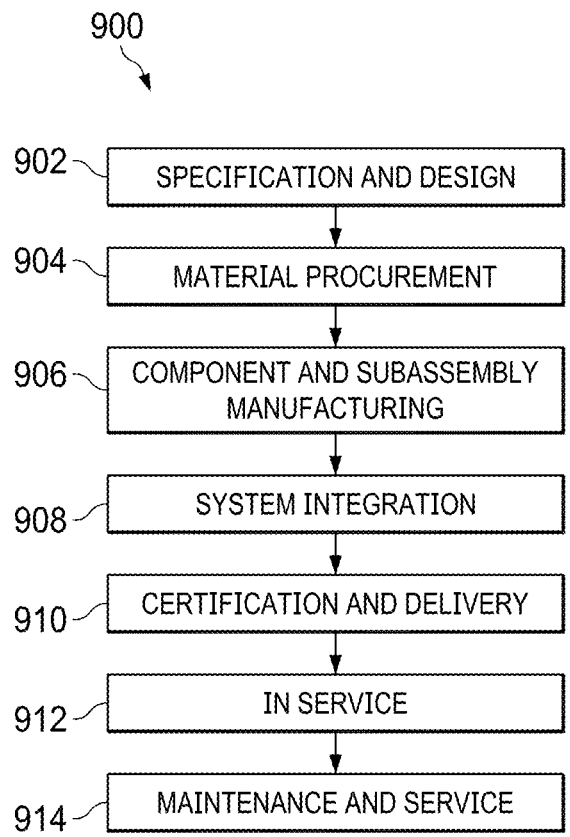
FIG. 9 is an illustration of an aircraft manufacturing and service method in the form of a block diagram in accordance with an illustrative embodiment.
Figure 10:
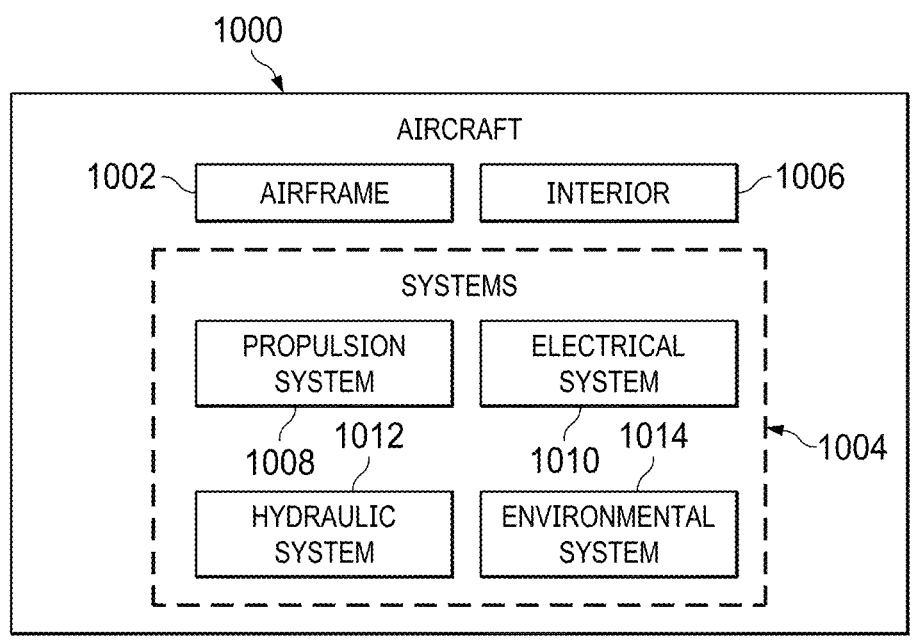
FIG. 10 is an illustration of an aircraft in the form of a block diagram in which an illustrative embodiment may be implemented.

The illustrative examples of the present disclosure may be described in the context of aircraft manufacturing and service method 900 as shown in FIG. 9 and aircraft 1000 as shown in FIG. 10. Turning first to FIG. 9, an illustration of an aircraft manufacturing and service method is depicted in accordance with an illustrative example. During pre-production, aircraft manufacturing and service method 900 may include specification and design 902 of aircraft 1000 in FIG. 10 and material procurement 904.

During production, component and subassembly manufacturing 906 and system integration 908 of aircraft 1000 takes place. Thereafter, aircraft 1000 may go through certification and delivery 910 in order to be placed in service 912. While in service 912 by a customer, aircraft 1000 is scheduled for maintenance and service 914, which may include modification, reconfiguration, refurbishment, and other maintenance or service.

Each of the processes of aircraft manufacturing and service method 900 may be performed or carried out by a system integrator, a third party, and/or an operator. In these examples, the operator may be a customer. For the purposes of this description, a system integrator may include, without limitation, any number of aircraft manufacturers or major-system subcontractors; a third party may include, without limitation, any number of vendors, subcontractors, or suppliers; and an operator may be an airline, a leasing company, a military entity, a service organization, and so on.

With reference now to FIG. 10, an illustration of an aircraft is depicted in which an illustrative embodiment may be implemented. In this example, aircraft 1000 is produced by aircraft manufacturing and service method 900 in FIG. 9 and may include airframe 1002 with a plurality of systems 1004 and interior 1006. Examples of systems 1004 include one or more of propulsion system 1008, electrical system 1010, hydraulic system 1012, and environmental system 1014. Any number of other systems may be included.

Although the illustrative examples for an illustrative embodiment are described with respect to an aircraft, an illustrative embodiment may be applied to other types of platforms. The platform may be, for example, a mobile platform, a stationary platform, a land-based structure, an aquatic-based structure, and a space-based structure. More specifically, the platform, may be a surface ship, a tank, a personnel carrier, a train, a spacecraft, a space station, a satellite, a submarine, an automobile, a power plant, a bridge, a dam, a house, a manufacturing facility, a building, and other suitable platforms.

Apparatuses and methods embodied herein may be employed during at least one of the stages of aircraft manufacturing and service method 900. One or more illustrative examples may be used during component and subassembly manufacturing 906, system integration 908, or maintenance and service 914 of FIG. 9. For example, it may be determined if composite tows 104 have sufficient contact 110 using system 108 of FIG. 1 while forming a composite structure during component and subassembly manufacturing 906. As another example, laying up composite tows 104 forms a composite structure that is a replacement part during maintenance and service 914 of FIG. 9 that may be evaluated for sufficient contact 110 using system 108 of FIG. 1.

Apparatuses and methods embodied herein may be employed in manufacturing at least one component of aircraft 1000. For example, a composite structure formed using system 108 including composite laying head 102 may be a component of one of airframe 1002 or interior 1006.

The illustrative examples provide real-time infrared (IR) measurement of placement inconsistencies, such as gap, lap, ply drops, ply location, missing tows, bridged tows, level of contact, and intimate contact correlating to tack. The infrared (IR) camera also has the ability to capture any layup inconsistencies during the layup minimizing manual inspection. These inconsistencies include un-tacked tows, bridging, disbonds, inclusions, wrinkles, folds, and puckers. The illustrative examples also assist in obtaining material processing conditions during automated fiber placement (AFP) by tying composite tack to the determined temperature in infrared images of the composite material on a substrate. The illustrative examples control consolidation of composite material by controlling parameters of the layup process such as heating, compaction pressure, and compaction speed. Running parts at the desirable temperature will minimize inconsistencies like un-tacked tows, bridging, wrinkles and puckers seen during automated fiber placement (AFP) layup.

The illustrative examples provide feedback control based on acquired infrared images and determinations using the infrared images. In some illustrative examples, feedback control may provide changes or instructions for immediate changes. For example, the illustrative examples may provide changes to heat, compaction speed, or compaction pressure to control the composite tow application process. Feedback control provides for Stop after pass when inconsistencies are detected and need to be dealt with immediately.

In some illustrative examples, feedback control may provide changes for subsequent steps, such as applying additional pressure to areas with disbands or untacked composite upon further composite application. The illustrative examples provide for long term process monitoring/trend analysis. The illustrative examples provide for correlation of the infrared (IR) imaging with optical imaging and non-contact measurements like laser line scanning, for improved process understanding.

Automated Defect Recognition (ADR) may be applied for detection/measurement, tracking, on-the-fly decision-making, or trends of inconsistencies. The illustrative examples provide automated fiber placement (AFP)/automated tape placement (ATP) system qualification using IR data.

The illustrative examples may reduce the cost and flow time of automated fiber placement or tape placement processes by providing real-time information of inconsistency type, shape, location, as well as rich data for analytics, feedback control, and process improvement. The illustrative examples may reduce the manual inspection for inconsistencies on each layer, and reduce the downtime associated with reworking inconsistencies between layers.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method, comprising:
   directing an infrared camera aft of a compaction roller of a composite laying head;
   applying heat to a substrate by a heater, wherein the heater is mounted forward of the compaction roller;
   using the infrared camera, capturing an infrared image of composite tows that are laid on the substrate by the compaction roller, wherein the infrared image comprises pixels; and
   determining, using the infrared image, a degree of contact between the composite tows and the substrate, wherein the degree of the contact is a quantified value of the contact between the composite tows and the substrate.

2. The method of claim 1 further comprising a step of determining, using the infrared image, whether the contact between the composite tows and the substrate is sufficient.

3. The method of claim 2 further comprising:
   modifying, when the contact between the composite tows and the substrate is determined to be insufficient, at least one of the heat applied to the substrate by the heater, a compaction speed of the compaction roller, or a compaction pressure applied by the compaction roller,
   wherein the step of determining, using the infrared image, whether the contact between the composite tows and the substrate is sufficient is performed in real-time.

4. The method of claim 2, wherein the step of determining, using the infrared image, whether the contact between the composite tows and the substrate is sufficient comprises:
   sampling intensities of the pixels of the infrared image across a width of the composite tows to define a group of sampled intensities, which has an intensity range, having a value; and
   determining if the value of the intensity range of the group of the sampled intensities is greater than a threshold, wherein the value of the intensity range is a difference between a highest intensity and a lowest intensity in the group of the sampled intensities.

5. The method of claim 2, wherein the step of determining, using the infrared image, whether the contact between the composite tows and the substrate is sufficient comprises:
   sampling intensities of the pixels of the infrared image across a width of the composite tows to define a group of sampled intensities; and
   determining if any one of the sampled intensities of the group of the sampled intensities is above or below a set intensity range.

6. The method of claim 2, wherein the step of determining, using the infrared image, whether the contact between the composite tows and the substrate is sufficient comprises:
   identifying edges for at least one of the composite tows.

7. The method of claim 1, further comprising:
determining a level of tack of the composite tows using at least one of the infrared image, the degree of the contact between the composite tows and the substrate, or a metric, relating the level of tack to intensities of pixels of the infrared image.

8. The method of claim 7, further comprising:
modifying, based on the level of tack determined, at least one of the heat applied to the substrate, a compaction speed of the compaction roller, or a compaction pressure applied by the compaction roller.

9. The method of claim 7, wherein:
a uniformity of material temperature in the composite tows behind the compaction roller is indicative of the degree of the contact between the composite tows and the substrate, and an actual temperature of each of the composite tows, determined using the infrared image, is indicative of a value of tack of each of the composite tows.

10. The method of claim 1, wherein the step of capturing the infrared image of the composite tows that are laid down on the substrate by the compaction roller is performed by the infrared camera, wherein the infrared camera is mounted aft of the compaction roller.

11. The method of claim 1, further comprising:
identifying an area for rework when it is determined that the contact between the composite tows and the substrate is not sufficient.

12. A method, comprising steps of:
laying down composite tows on a substrate using a composite laying head with a compaction roller and a heater, wherein the heater is mounted forward of the compaction roller;
capturing an infrared image of the composite tows on the substrate, after laying down the composite tows on the substrate, using an infrared camera mounted aft of the compaction roller; and
determining a level of tack of the composite tows using the infrared image, wherein the tack is a measure of a strength of a bond between the composite tows and the substrate, and wherein the level of tack is a quantified value of the tack of the composite tows.

13. The method of claim 12, wherein the substrate is a test substrate, wherein the step of laying down the composite tows on the substrate comprises laying down the composite tows on the test substrate, and wherein the step of capturing the infrared image of the composite tows on the substrate comprises capturing the infrared image of the composite tows on the test substrate, the method further comprising:
laying down the composite tows on a production substrate using parameters, selected based on the level of tack of the composite tows, wherein the parameters comprise at least one of an amount of heat applied to the production substrate by the heater, a compaction speed of the compaction roller, or a compaction pressure applied by the compaction roller.

14. The method of claim 13, further comprising:
capturing an infrared image of the composite tows on the production substrate, after laying down the composite tows on the production substrate, using the infrared camera; and
determining, using the infrared image of the composite tows on the production substrate, whether contact between the composite tows and the production substrate is sufficient.

15. The method of claim 12, further comprising:
modifying, based on the level of tack of the composite tows, determined using the infrared image, at least one of a heat applied to a production substrate, a compaction speed of the compaction roller, or a compaction pressure applied by the compaction roller.

16. The method of claim 12, wherein the step of determining the level of tack of the composite tows comprises determining the level of tack of the composite tows using the infrared image, a degree of contact between the composite tows and a production substrate, or a metric, relating the level of tack to intensities of pixels of the infrared image.

17. A system, comprising:
a composite laying head with a compaction roller;
a heater, mounted forward of the compaction roller;
an infrared camera, mounted aft of the compaction roller, wherein the infrared camera is configured to capture an infrared image of composite tows that are laid down on a substrate by the compaction roller; and
a composite analyzer, configured to determine, using the infrared image, a degree of contact between the composite tows and the substrate, wherein the degree of the contact is a quantified value of the contact between the composite tows and the substrate.

18. The system of claim 17, further comprising:
a controller configured to modify, when the contact between the composite tows and the substrate is determined to be insufficient, at least one of an amount of heat applied by the heater to the substrate, a compaction speed of the composite laying head, or a compaction pressure of the composite laying head.

19. The system of claim 18, wherein the composite analyzer is configured to determine, in real time, whether the contact between the composite tows and the substrate is sufficient.

20. The system of claim 17, wherein the composite analyzer is further configured to determine a level of tack of the composite tows using at least one of the infrared image, the degree of the contact between the composite tows and the substrate or a metric, relating the level of tack to intensities of pixels of the infrared image.

* * * * *